United States Patent [19]

Tsutsumi et al.

[11] Patent Number: 4,916,962
[45] Date of Patent: Apr. 17, 1990

[54] RECLINING ANGLE ADJUSTMENT DEVICE

[75] Inventors: Yasuhisa Tsutsumi; Kazuyuki Kurashige, both of Fujisawa, Japan

[73] Assignee: Shiroki Kinzoku Kogyo Kabushiki Kaisha, Fujisawa, Japan

[21] Appl. No.: 346,309

[22] Filed: May 2, 1989

Related U.S. Application Data

[63] Continuation of Ser. No. 143,390, Jan. 13, 1986, abandoned.

[51] Int. Cl.⁴ .............................................. B60N 1/02
[52] U.S. Cl. ...................................... 74/392; 74/409; 297/362

[56] References Cited

U.S. PATENT DOCUMENTS

| | | | |
|---|---|---|---|
| 3,129,659 | 4/1964 | Lauer | 74/392 |
| 4,025,109 | 5/1977 | Klingelhöfer et al. | 297/362 |
| 4,227,741 | 10/1980 | Gross et al. | 297/362 |
| 4,407,544 | 10/1983 | Bähring | 297/362 |
| 4,453,767 | 6/1984 | Walk et al. | 297/362 |
| 4,708,392 | 11/1987 | Werner et al. | 297/362 |
| 4,715,656 | 12/1987 | Walk et al. | 297/362 |

Primary Examiner—Leslie A. Braun
Assistant Examiner—Scott Anchell
Attorney, Agent, or Firm—Finnegan, Henderson, Farabow, Garrett & Dunner

[57] ABSTRACT

A reclining angle adjustment device for a seat includes a shaft having a concentric portion and an eccentric portion and rotatable for adjusting the reclining angle of the seat, the eccentric portion comprising an axially movable tapered ring, a gear train including an external gear and an internal gear meshing with the internal gear, the internal gear having more teeth than the external gear, a first arm having one of the external and internal gears which is rotatably fitted at its center over the concentric portion, and a second arm having the other of the external and internal gears which is rotatably fitted at its center over the tapered ring. A resilient member engages the tapered ring for normally pressing the tapered ring axially along the shaft in a direction to strengthen meshing engagement between the external and internal gears.

4 Claims, 4 Drawing Sheets

RECLINING ANGLE ADJUSTMENT DEVICE

This is a continuation of Ser. No. 143,390, filed Jan. 13, 1988, now abandoned.

BACKGROUND OF THE INVENTION

The present invention relates to a reclining angle adjustment device for adjusting the angle of inclination of the seat back of a reclining seat in a motor vehicle, i.e., the reclining angle of the reclining seat.

There are known reclining angle adjustment devices in which the reclining angle is adjusted by means of a gear train mechanism.

The gear train mechanism employed in the reclining angle adjustment device is composed of a first arm having an external gear, a second arm having an internal gear with more than those of the external gear, and a shaft having a concentric portion inserted through the center of the external gear and an eccentric portion inserted through the center of the internal gear. The external and internal gears are held in mesh with each other through the shaft. When the shaft is rotated about its own axis, the angle of the first arm with respect to the second arm is varied. Therefore, by attaching one of the first and second arms to the frame of the seat back of a seat and the other arm to the frame of the seat cushion thereof, the reclining angle of the seat can be adjusted by rotating the shaft.

The first arm, the second arm, and the shaft are machined so that they mesh without biting into each other irrespective of machining tolerances. Therefore, there are always gaps or backlashes between fitting and meshing members of the first arm, the second arm, and the shaft. These gaps or backlashes result in unwanted motion of the seat back with respect to the seat cushion, making the person on the seat uncomfortable and producing noise. While the motor vehicle is running, the first arm may vibrate with respect to the second arm due to vibration of the motor vehicle, and the shaft may temporarily become free to rotate of its own accord about its own axis, so that the second arm and hence the seat back may be tilted even when no angle adjustment is made for the seat back. The discomfort which the person on the seat may suffer, the noise produced by the seat back, and the accidental rotation of the shaft tend to increase with increased gaps due to localized machining tolerances of the members.

SUMMARY OF THE INVENTION

It is an object of the present invention to provide a reclining angle adjustment device which will not make the person on a seat uncomfortable and not give out noise due to backlash-induced movement.

Another object of the present invention is to provide a reclining angle adjustment device having a shaft which will not rotate of its own accord about its own axis.

Still another object of the present invention is to provide a reclining angle adjustment device having a relatively simple structure for preventing a shaft from rotating about its own axis.

A further object of the present invention is to provide a reclining angle adjustment device for a seat, comprising a shaft having a concentric portion and an eccentric portion and rotatable for adjusting the reclining angle of the seat, the eccentric portion comprising an axially movable tapered ring; a gear train including an external gear and an internal gear meshing with the internal gear, the internal gear having more teeth than the external gear; a first arm having one of the external and internal gears, said one of the external and internal gears being rotatably fitted at its center over the concentric portion; a second arm having the other of the external and internal gears, said other of the external and internal gears being rotatably fitted at its center over the tapered ring; and a resilient member engaging the tapered ring for normally pressing the tapered ring axially along the shaft in a direction to strengthen meshing engagement between the external and internal gears.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE EMBODIMENTS

Figure 1:
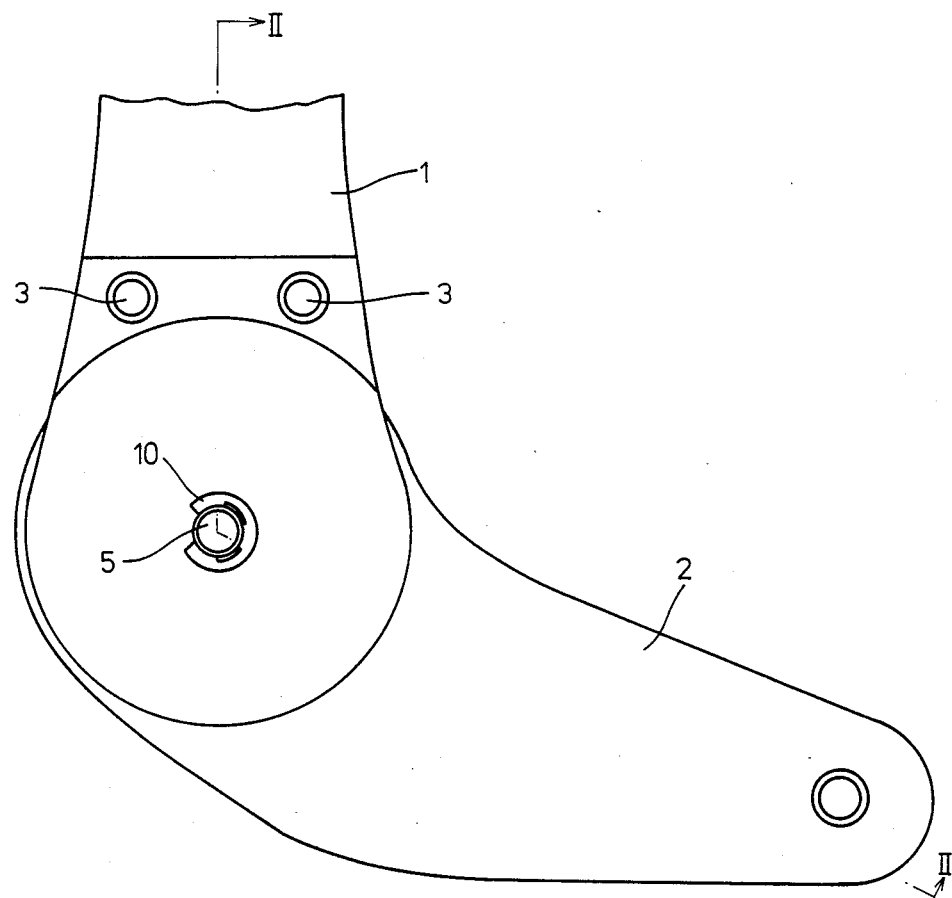
FIG. 1 is a side elevational view of a reclining angle adjustment device according to an embodiment of the present invention.
Figure 2:
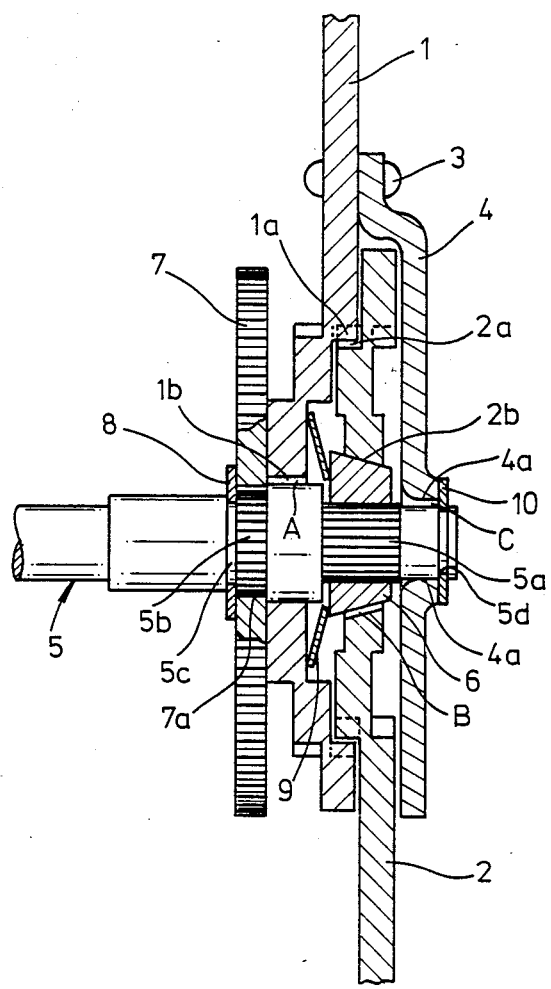
FIG. 2 is an enlarged cross-sectional view taken along line II—II of FIG. 1.

As shown in FIGS. 1 and 2, a reclining angle adjustment device according to an embodiment of the present invention includes an upper arm (first arm) 1 fixed to the seat back frame (not shown) of the reclining seat, and a lower arm (second arm) 2 fixed to the seat cushion frame (not shown) of the reclining seat. As illustrated in FIG. 2, the upper and lower arms 1, 2 have internal and external gears 1a, 2a, respectively, embossed on sides thereof as by precision pressing. The number of teeth of the internal gear 1a is selected to be at least one larger than the number of teeth of the external gear 2a. A cover 4 is secured to the side of the upper arm 1 facing the lower arm 1 by means of a rivets 3. The internal gear 1a of the upper arm 1 has a through hole 1b defined centrally therein, while the external gear 2a of the lower arm 2 has a tapered through hole 2b defined centrally therein. The cover 4 has a through hole 4a defined therein. A shaft 5 has concentric portions rotatably fitted in the through holes 1b, 4a, respectively, and an eccentric portion rotatably fitted in the through hole 2b. The eccentric portion of the shaft 5 is constructed of a tapered ring 6 having a tapered outer peripheral surface and movable axially along the shaft 5. More specifically, the shaft 5 has serrations 5a, and the tapered ring 6 has a hole 6a defined eccentrically therein and having on its inner peripheral surface serrations fitted over the serrations 5a. The upper arm 1 and the lower arm 2 are thus rotatably mounted on the concentric and eccentric portions, respectively, of the shaft 5. The upper arm 1, the lower arm 2, and the shaft 5 jointly constitute a gear train mechanism. A gear 7 having a hole 7a defined centrally therein and having serrations on its inner peripheral surface is disposed around the shaft 5 on one side of the upper arm 1 remote from the lower arm 2.

The gear 7 is rotatable by a motor (not shown). The hole 7a of the gear 7 is fitted over second serrations 5b of the shaft 5 which engage the serrations of the gear hole 7a. The shaft 5 is thus rotatable with the gear 7. The gear 7 is retained on the shaft 5 by means of a retaining ring 8 engaging in a groove 5c defined in the shaft 5 adjacent to the second serrations 5b. A resilient member, which comprises a Belleville spring 9 in the embodiment, is disposed coaxially on the shaft 5 within a space defined axially between the upper arm 1 and the tapered ring 6. The tapered ring 6 is normally urged to the right (FIG. 2) toward the cover 4 under the bias of the Belleville spring 9. The end of the shaft 5 has a groove 5d in which a retaining ring 10 engages to retain the cover 4 on the shaft 5.

Figure 3:
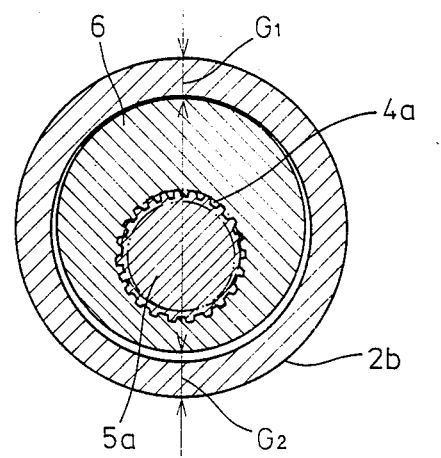
FIG. 3 is a view showing the positional relationship between an external gear, an internal gear, and a shaft of the reclining angle adjustment device.

The reclining angle adjustment device thus constructed operates as follows: When the motor (not shown) is energized, the gear 7 is rotated and so is the shaft 5 in unison therewith. Rotation of the shaft 5 causes the gear train mechanism to turn the upper arm 1 at a certain speed reduction ratio for adjusting the angle of the seat back with respect to the seat cushion. With the illustrated arrangement, the tapered ring 6 is normally pressed to the right under the resiliency of the Belleville spring 9. As shown in FIG. 3, the distance $G_1$ between the inner peripheral surface of the hole 2b of the upper arm 2 and the outer peripheral surface of the tapered ring 6 (the eccentric portion of the shaft 5) in the direction (referred to as the "eccentric direction") in which the eccentric portion is displaced off center is smaller than the distance $G_2$ therebetween in the direction diametrically opposite to the eccentric direction ($G_1 < G_2$), so that the tapered ring 6 serves as a wedge at a position P in FIG. 3 or in the eccentric direction. Since the tapered ring 6 serves as a wedge, the shaft 5 and the upper arm 1 are moved with respect to the lower arm 2 in a direction to strengthen the meshing engagement between the internal and external gears 1a, 2a, i.e., in the eccentric direction under the bias of the Belleville spring 9. Therefore, the meshing region D of the internal and external gears 1a, 2a is free of backlash. Where the meshing region D of the internal and external gears 1a, 2a is in an upper position as shown in FIG. 2, a gap A between the surface defining the through hole 1b of the upper arm 1 and the shaft 5 is produced upwardly of the through hole 1b, a gap B between the surface defining the through hole 2b of the lower arm 2 and the shaft 5 is produced downwardly of the through hole 2b, and a gap C between the surface defining the through hole 4a of the cover 4 and the shaft 5 is produced upwardly of the through hole 4a. The concentric portions of the shaft 5 are thus pressed against the lower surfaces, respectively, of the holes 1b, 4a.

With the arrangement of the present invention, the shaft 5 and the inner peripheral surfaces of the holes 1b, 4a which engage the shaft 5 are pressed against each other under the resilient force of the Belleville spring 9 applied through the wedging tapered ring 6. Moreover, the internal and external gears 1a, 2a are forced into mesh with each other in the meshing region D under the resilient force of the Belleville spring 9 applied through the wedging tapered ring 6. Therefore, no backlash is present between these engaging members, and the person on the seat will not be made uncomfortable and no noise will be produced by backlashes which would otherwise exist. Even when the seat is subjected to vibration while the vehicle is running, the upper arm 1 is prevented from becoming temporarily free from the lower arm 2 to allow the upper arm 1 and hence the seat back to turn or be tilted without any angle adjustment.

A reclining angle adjustment device according to another embodiment of the present invention will be described with reference to FIG. 4. Those parts in FIG. 4 which are identical to those of the previous embodiment will be denoted by identical reference numerals, and will not be described in detail. The shaft 5 has a concentric portion 5e disposed in the hole 1b of the upper arm 1, an eccentric cylindrical portion 5f disposed in the hole 2b of the lower arm 2, and an externally threaded portion 5g disposed on one side of the groove 5c remote from the upper arm 1. The gear 7 is mounted on the shaft 5 by means of a washer 11 engaging in the groove 5c and a nut 12 threaded over the externally threaded portion 5g. A tapered ring 13 having a concentric hole defined therein is axially movably fitted over the eccentric cylindrical portion 5f. Thus, the upper arm 1 and the lower arm 2 are rotatably mounted respectively on the concentric portion and the eccentric portion (the tapered ring 1) of the shaft 5, and the internal gear 1a and the external gear 2a are held in mesh with each other. The upper arm 1, the lower arm 2, and the shaft 5 jointly constitute a gear train mechanism. A resilient member, which comprises a Belleville spring 14 in this embodiment, is disposed coaxially on the shaft 5 under compression within a space defined axially between the lower arm 2 and the cover 4. The tapered ring 13 is normally urged to the left (FIG. 4) away from the cover 4 under the bias of the Belleville spring 14. Where the meshing region D of the internal and external gears 1a, 2a is in an upper position as shown, the same gaps A, B, C as those of the previous embodiment are produced as shown in FIG. 4.

Figure 4:
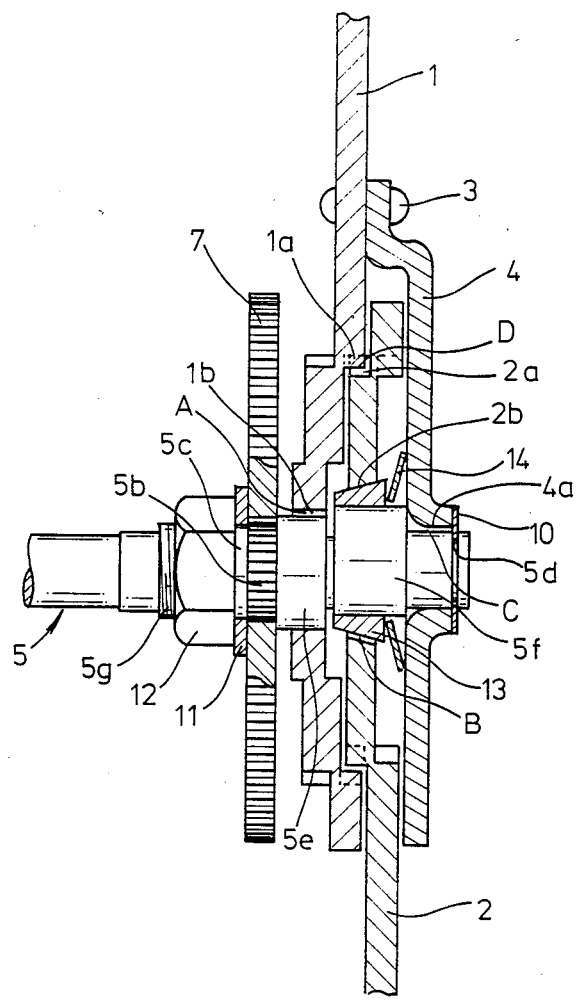
FIG. 4 is a cross-sectional view of a reclining angle adjustment device according to another embodiment of the present invention.

In the embodiment of FIG. 4, also, the shaft 5 and the inner peripheral surfaces of the holes 1b, 4a which engage the shaft 5 are pressed against each other under the resilient force of the Belleville spring 14 applied through the wedging tapered ring 13. Moreover, the internal and external gears 1a, 2a are forced into mesh with each other in the meshing region D under the resilient force of the Belleville spring 14 applied through the wedging tapered ring 13. Therefore, no backlash is present between these engaging members, and the person on the seat will not be made uncomfortable and no noise will be produced by backlashes which would otherwise exist. The upper arm 1 is prevented from becoming temporarily free from the lower arm 2 to allow the upper arm 1 and hence the seat back to turn or be tilted accidentally.

The external gear may be on the upper arm and the internal gear may be on the lower arm, and the eccentric portion of the shaft may be rotatably disposed in the external gear and the concentric portion may be rotatably disposed in the internal gear.

Although certain preferred embodiments have been shown and described, it should be understood that many changes and modifications may be made therein without departing from the scope of the appended claims.

We claim:

1. A reclining angle adjustment device for a seat, comprising:
    a shaft having a concentric portion and an eccentric portion and rotatable for adjusting the reclining angle of the seat, said eccentric portion comprising a tapered ring axially movable relative to said shaft;

a gear train including an external gear and an internal gear meshing with said external gear, said internal gear having more teeth than said external gear;

a first arm having one said external and internal gears, said one of the external and internal gears being rotatably fitted at its center over said concentric portion;

a second arm having the other of said external and internal gears, said other of the external and internal gears being rotatably fitted at its center over said tapered ring; and a resilient member engaging said tapered ring for normally pressing the tapered ring axially along said shaft in a direction to strengthen meshing engagement between said external and internal gears.

2. A reclining angle adjustment device according to claim 1, wherein said internal gear is embossed on said first arm, said external gear is embossed on said second arm, said resilient member being disposed between said first and second arms for pressing said tapered ring.

3. A reclining angle adjustment device according to claim 1, wherein said internal gear is embossed on said first arm, said external gear is embossed on said second arm, further including a cover cooperating with said first arm in sandwiching said second arm therebetween, said resilient member being disposed between said cover and said second arm for pressing said tapered ring.

4. A reclining angle adjustment device according to claim 2, wherein said resilient member comprises a Belleville spring through which said shaft extends.

* * * * *